(12) United States Patent  (10) Patent No.: US 7,341,807 B2
Wang et al.  (45) Date of Patent: Mar. 11, 2008

(54) NON-FLAMMABLE NONAQUEOUS ELECTROLYTE SOLUTION AND LITHIUM ION CELL USING SAME

(75) Inventors: Xianming Wang, Tsukuba (JP); Yoshitsugu Sone, Tsukuba (JP); Saburo Kuwajima, Tsukuba (JP); Kenichi Kuwajima, Kanagawa (JP)

(73) Assignee: Japan Aerospace Exploration Agency, Tokyo (JP)

( * ) Notice: Subject to any disclaimer, the term of this patent is extended or adjusted under 35 U.S.C. 154(b) by 0 days.

(21) Appl. No.: 11/362,533

(22) Filed: Feb. 27, 2006

(65) Prior Publication Data

US 2006/0240329 A1  Oct. 26, 2006

Related U.S. Application Data

(63) Continuation of application No. PCT/JP03/10792, filed on Aug. 26, 2003.

(51) Int. Cl.
*H01M 10/40* (2006.01)

(52) U.S. Cl. ............... 429/328; 429/330; 429/331; 429/332

(58) Field of Classification Search ............... 429/328, 429/329, 330, 331, 332
See application file for complete search history.

(56) References Cited

U.S. PATENT DOCUMENTS 6,919,145 B1 * 7/2005 Kotato et al. ............ 429/330 X
2006/0172201 A1 * 8/2006 Yasukawa et al. ........... 429/329

FOREIGN PATENT DOCUMENTS

| JP | 2000215911 | 8/2000 |
|---|---|---|
| JP | 2000235867 | 8/2000 |
| JP | 2000348762 | 12/2000 |
| JP | 2001052743 | 2/2001 |
| JP | 2001160414 | 6/2001 |
| JP | 2002203597 | 7/2002 |
| JP | 2002280061 | 9/2002 |
| JP | 2003234127 | 8/2003 |

* cited by examiner

*Primary Examiner*—Stephen J. Kalafut
(74) *Attorney, Agent, or Firm*—Jacobson Holman PLLC

(57) ABSTRACT

Disclosed are a non-flammable nonaqueous electrolyte solution and a lithium ion cell using the electrolyte solution. The non-flammable nonaqueous electrolyte solution comprises a ternary or higher-order compound additive, a high concentration of lithium salt and a phosphoric ester serving as a primary solvent. The lithium ion cell comprises a positive electrode containing a lithium transition metal oxide capable of absorbing and releasing lithium, a negative electrode containing a carbon-based material capable of absorbing and releasing lithium, and the above non-flammable nonaqueous electrolyte solution. The ternary or higher-order compound additive contains at least one compound selected from each of the three compound groups consisting of: a compound group (a) of vinylene carbonate compounds; a compound group (b) of vinyl acetate compounds, alkyl methyl carbonate compounds and vinyl ethylene carbonate compounds; and a compound group (c) of 2-pyrrolidinone compounds, cyclic alkyl compounds and cyclic pentanone compounds. The non-flammable nonaqueous electrolyte solution of the present invention can provide enhanced charge/discharge characteristics to a lithium ion cell.

5 Claims, 5 Drawing Sheets

NON-FLAMMABLE NONAQUEOUS ELECTROLYTE SOLUTION AND LITHIUM ION CELL USING SAME

CROSS-REFERENCE TO RELATED APPLICATION

The present patent application is a continuation of International application No. PCT/JP2003/010792 filed Aug. 26, 2003 and published in Japanese, which is incorporated herein by reference in its entirety.

TECHNICAL FIELD

The present invention relates to a non-flammable nonaqueous electrolyte solution and a lithium ion cell using the electrolyte solution, and more specifically to a non-flammable nonaqueous electrolyte containing a ternary or higher-order compound additive for improving charge/discharge characteristics of a lithium ion cell, a high concentration of lithium salt and a cyclic or phosphoric ester compound having solvent at a high composition ratio, and a lithium ion cell using the electrolyte solution.

BACKGROUND ART

A lithium ion cell having a high energy density and a high operating voltage has rapidly come into wide use as a power source for mobile or portable devices, such as portable phones, notebook-size personal computers and video cameras. Further, various researches for practical application to a satellite, a rocket, an electric vehicle and a nighttime-electric-power storage system are being conducted.

A lithium ion cell employs a carbon-based material and a lithium transition metal oxide, such as $LiCoO_2$, respectively, in negative and positive electrode, and has an operating voltage of 4 V or more. Thus, an electrolyte solution for lithium ion cells is required to have electrochemical stability even in an operation at 4 V or more. A nonaqueous electrolyte solution prepared by dissolving an electrolyte, such as lithium fluorophosphate ($LiPF_6$), in a mixture of carbonate-based nonaqueous solvents, such as ethylene carbonate (EC), diethyl carbonate (DEC), ethyl methyl carbonate (EMC) has been developed to meet such a requirement, and put into general use.

However, due to relatively low flash or inflammation points of these nonaqueous solvents, the nonaqueous electrolyte solution involves a problem about safety, firing or explosion likely to be caused by a wrong operation, such as short-circuiting, overcharge or over-discharge. As measures against this problem, it has been proposed to prepare a nonaqueous electrolyte solution using a mixture of a fluorinated solvent and an organic phosphate compound having no flash point. For example, Japanese Patent Laid-Open Publication Nos. 2000-235867 and 2002-280061 disclose the use of an organic phosphate compound, such as trimethyl phosphate or triethyl phosphate. However, if this organic phosphate compound is applied to a lithium ion cell, it will be reductively decomposed on a surface of a carbon-based negative electrode to preclude charge-discharge functions as a cell. While the charge-discharge functions can be maintained by mixing an inflammable solvent, such as carbonate-based solvent, with the an organic phosphate compound solvent, while limiting a ratio (volume ratio) of the organic phosphate compound in the mixed solvent to 50% or less, a primary solvent will consist of a low-flash-point solvent, such a carbonate-based, lactone-based, ether-based, sulfolane-based or dioxolan-based solvent, resulting in loss of non-flammability as an electrolyte solution.

Japanese Patent Laid-Open Publication Nos. 2000-348762 and 2000-215911 discloses the use of a fluorinated solvent. This fluorinated solvent has a problem about no applicability to a 4 V-class lithium ion cell, due to poor oxidation/reduction resistances and low solubility relative to lithium salts.

Japanese Patent Laid-Open Publication No. 2002-203597 discloses a technique of adding vinylene carbonate and/or vinyl ethylene carbonate into a phosphate ester-based electrolyte solution to suppress reductive decomposition of an organic phosphate compound. However, it is practically difficult to fully eliminate reductive decomposition of an organic phosphate compound based on the addition of the two compounds, and an obtained cell is not insufficient in terms of practical usefulness, due to poor charge/discharge characteristics.

As above, from a standpoint of improving both charge/discharge characteristics and safety in a cell, there is a strong need for developing a new mixed additive and employing an optimal type and concentration of lithium ion salt to obtain a non-flammable nonaqueous electrolyte solution capable of suppressing reductive decomposition of phosphate ester on a surface of a carbon-based negative electrode so as to achieve a lithium ion cell having enhanced charge/discharge characteristics.

DISCLOSURE OF THE INVENTION

In view of the above problems, it is therefore an object of the present invention to provide a non-flammable phosphate ester-based electrolyte solution for a lithium ion cell having excellent charge/discharge characteristics, and a lithium ion cell using the electrolyte solution.

In order to achieve the above object, through various researches for bringing about breakthrough, the inventors found that a non-flammable nonaqueous electrolyte solution containing a phosphate ester having solvent at a high composition ratio, in combination with a newly developed ternary or higher-order mixed additive and a discovered optimal type and concentration of lithium salt, can drastically improved charge/discharge characteristics of a lithium ion cell at astoundingly high level to achieve the above object. Based on this knowledge, the inventors have finally reached the present invention.

Specifically, according a first aspect of the present invention, there is provided a non-flammable nonaqueous electrolyte solution which comprises a ternary or higher-order compound additive, a high concentration of lithium salt and a phosphoric ester serving as a primary solvent. According a second aspect of the present invention, there is provided a lithium ion cell which comprises a positive electrode containing a lithium transition metal oxide capable of absorbing and releasing lithium, a negative electrode containing a carbon-based material capable of absorbing and releasing lithium, and the above non-flammable nonaqueous electrolyte solution. In the first and the second aspect of the present invention, the ternary or higher-order compound additive contains at least one compound selected from each of the three compound groups consisting of: a compound group (a) of vinylene carbonate compounds represented by the following formula (I); a compound group (b) of vinyl acetate compounds represented by the following formula (II), alkyl methyl carbonate compounds represented by the following formula (III) and vinyl ethylene carbonate compounds represented by the following formula (IV); and a compound group (c) of 2-pyrrolidinone compounds represented by the following formula (V), cyclic alkyl compounds represented by the following formula (VI) and cyclic pentanone compounds represented by the following formula (VII),

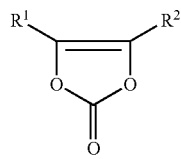
(I)

wherein $R^1$ and $R^2$ each independently represents a hydrogen atom or a straight-chain or branched-chain alkyl group having 1 to 4 carbon atoms,

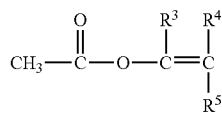
(II)

wherein $R^3$, $R^4$ and $R^5$ each independently represents a hydrogen atom or a straight-chain or branched-chain alkyl group having 1 to 4 carbon atoms,

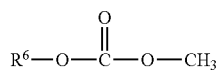
(III)

wherein $R^6$ represents a hydrogen atom or a straight-chain or branched-chain alkyl group having 1 to 4 carbon atoms,

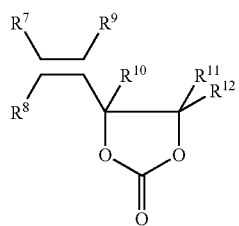
(IV)

wherein $R^7$, $R^8$, $R^9$, $R^{10}$, $R^{11}$ and $R^{12}$ each independently represents a hydrogen atom or a straight-chain or branched-chain alkyl group having 1 to 4 carbon atoms,

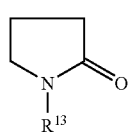
(V)

wherein $R^{13}$ represents a hydrogen atom or a straight-chain or branched-chain alkyl group having 1 to 4 carbon atoms,

(VI)

wherein $R^{14}$ represents a straight-chain or branched-chain alkylene group having 2 to 4 carbon atoms,

(VII)

wherein $R^{15}$ represents a straight-chain or branched-chain alkylene group having 1 to 3 carbon atoms.

Preferably, each of the ternary or higher-order compound additives selected from the above compound groups (a) to (c) is added to the non-flammable phosphate ester-based electrolyte solution having a lithium salt dissolved therein, in an amount ranging from 1 to 12% by weight, wherein the total amount of the additives is in the range of 5 to 20% by weight.

Preferably, the lithium salt is an inorganic salt formed from a lithium ion and an anion selected from PF6 and BF4, and/or an organic salt formed from a lithium ion and an anion selected from those represented by the following general formula (VIII), and a total concentration of the lithium salt in the phosphate ester-based solvent is preferably in the range of 1.5 to 2.5 mol/dm³,

(VIII)

wherein m and n each independently represents an integer selected from 1 to 4.

Preferably, the phosphate ester-based electrolyte solution contains at least one of a chain phosphate ester represented by the following general formula (IX) and a cyclic phosphate ester represented by the following general formula (X), and the chain phosphate ester and/or the cyclic phosphate ester are contained in the phosphate ester-based solvent in an amount ranging from 50 to 100% by volume,

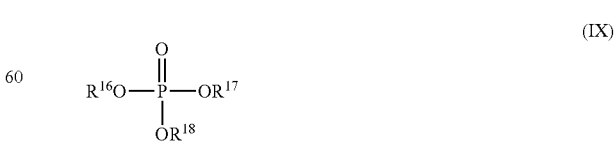
(IX)

wherein $R^{16}$, $R^{17}$ and $R^{18}$ each independently represents an alkyl group having 1 or 2 carbon atoms in which each of hydrogen may be substituted with fluorine,

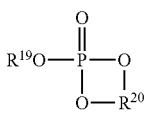

wherein R[19] represents an alkyl group having 1 or 2 carbon atoms in which each of hydrogen may be substituted with fluorine, and R[20] represents an alkylene group having 2 to 4 carbon atoms.

BEST MODE FOR CARRYING OUT THE INVENTION

Figure 1:
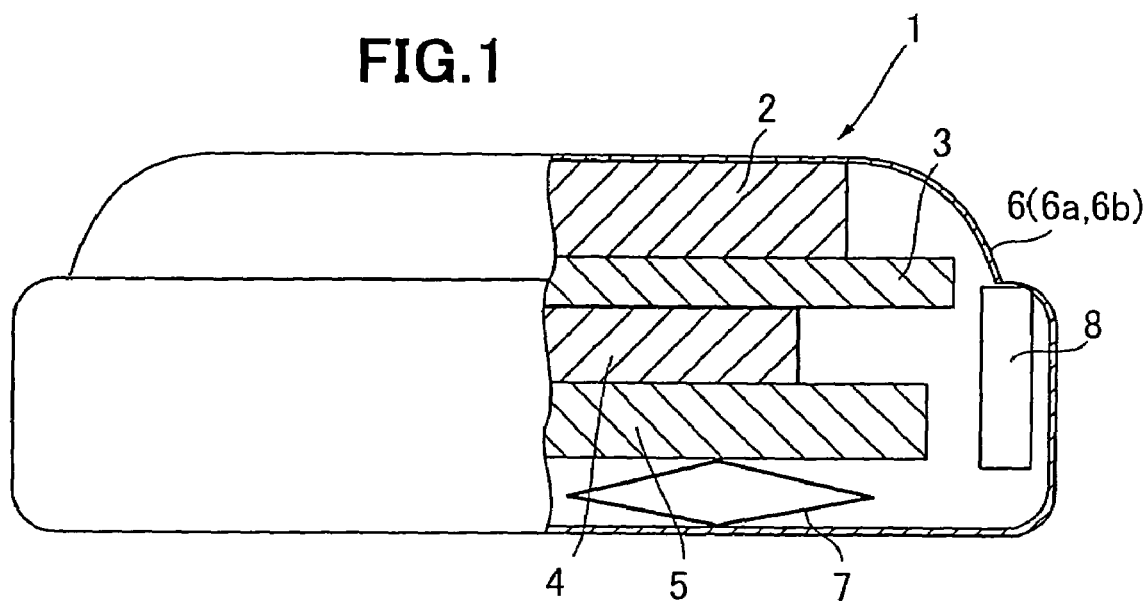
FIG. 1 is a sectional view showing the structure of a coin-shaped lithium ion cell serving as a test sample.

The present invention will now be specifically described. Firstly, a non-flammable nonaqueous electrolyte solution of the present invention will be described in detail based on a preferred embodiment thereof.

In the present invention, a compound additive to be added to a non-flammable phosphate ester-based electrolyte solution contains at least one compound selected from each of the three compound groups consisting of: a compound group (a) of vinylene carbonate compounds represented by the aforementioned formula (I); a compound group (b) of vinyl acetate compounds represented by the aforementioned formula (II), alkyl methyl carbonate compounds represented by the aforementioned formula (III) and vinyl ethylene carbonate compounds represented by the aforementioned formula (IV); and a compound group (c) of 2-pyrrolidinone compounds represented by the aforementioned formula (V), cyclic alkyl compounds represented by the aforementioned formula (VI) and cyclic pentanone compounds represented by the aforementioned formula (VII).

Preferably, each of the additives selected from the above compound groups (a) to (c) is added to the non-flammable phosphate ester-based electrolyte solution having a lithium salt dissolved therein, in an amount ranging from 1 to 12% by weight, particularly in an amount ranging from 2 to 10% by weight. Further, the total amount of the additives selected from the above compound groups (a) to (c) is in the range of 5 to 20% by weight, particularly in an amount ranging from 8 to 17% by weight, with respect to the non-flammable phosphate ester-based electrolyte solution having a lithium salt dissolved therein. If each of the additives is added in an amount of less than 1% by weight, a reductive decomposition reaction of the phosphate ester on a surface of a carbon negative electrode cannot be effectively suppressed, to cause difficulty in sufficiently improving charge/discharge characteristics of a cell. If each of the additives is added in an amount of greater than 12% by weight, the additive will be reductively decomposed on the surface of the carbon negative electrode despite its intended purpose to cause the risk of undesirable deterioration in charge/discharge characteristics of a lithium ion cell.

The lithium salt for use in the present invention, which is a solute of the non-flammable phosphate ester-based electrolyte solution, is one or more selected from the group consisting of a lithium salt of inorganic acid and a lithium salt of organic acid.

Specifically, the lithium salt of inorganic acid in the present invention includes lithium fluorophosphates (LiPF$_6$), lithium fluoborate (LiBF$_4$) and lithium perchlorate (LiClO$_4$). Among them, LiPF$_6$ and LiBF$_4$ are preferable in view of superiority in charge/discharge characteristics of a cell.

The lithium salt of organic acid in the present invention includes lithium imide salts formed from a lithium ion and an anion selected from those represented by the aforementioned general formula (VIII). Among them, LiN(SO$_2$C$_2$F$_5$)$_2$ and LiN(SO$_2$CF$_3$)(SO$_2$C$_4$F$_9$) are preferable in view of superiority in charge/discharge characteristics of a cell.

Preferably, the lithium salt is dissolved in the phosphate ester-based solvent to have a concentration ranging from 1.5 to 2.5 mol/dm$^3$, particularly from 1.7 to 2.2 mol/dm$^3$, in the phosphate ester-based electrolyte solution. If a concentration of the lithium salt in the phosphate ester-based electrolyte solution is less than 1.5 mol/dm$^3$, a reductive decomposition reaction of the phosphate ester on the surface of the carbon negative electrode cannot be effectively suppressed, to cause difficulty in sufficiently improving charge/discharge characteristics of a cell. If a concentration of the lithium salt is greater than 2.5 mol/dm$^3$, the non-flammable phosphate ester-based electrolyte solution has an excessively low electric conductivity to case deterioration in charge/discharge characteristics of a lithium ion cell under a high charge/discharge rate.

The phosphate ester contained in the non-flammable phosphate ester-based electrolyte solution in the present invention includes a chain phosphate ester represented by the aforementioned general formula (IX), and a cyclic phosphate ester represented by the aforementioned general formula (X).

Among them, as a specific example of the phosphate ester containing no fluorine, trimethyl phosphate, dimethyl ethyl phosphate and ethylene methyl phosphate are particularly preferable because of no flash point. As a specific example of the phosphate ester containing fluorine, trifluoroethyl methyl ethyl phosphate and ethylene trifluoro ethyl methyl phosphate are particularly preferable because of no flash point.

The phosphate ester-based electrolyte solution in the present invention may contain a single phosphate ester or may contain two or more phosphate esters.

In order to improve charge/discharge characteristics of a cell, the non-flammable phosphate ester-based electrolyte solution in the present invention may contain an inflammable organic solvent which is commonly used as a non-aqueous electrolyte solution for secondary cells. This organic solvent is not limited to a specific type. For example, the organic solvent includes: a carbonate-based compound, such as ethylene carbonate, diethyl carbonate, methyl ethyl carbonate, dimethyl carbonate, propylene carbonate or vinylene carbonate; lactone-based compound, such as γ-butyrolactone; an ether-based compound, such as 1,3-dioxane or monogrime; a sulfolane-based compound, such as sulfolane; a dioxolan-based compound, such as 1,3-dioxolan; a ketone-based compound, such as 4-methyl-2-pentanone; a nitrile-based compound, such as acetonitrile, propionitrile, butyronitrile, valeronitrile or benzonitrile; a halogenated hydrocarbon-based compound, such as 1,2-dichloroethane; methyl sulfamate; dimethyl thioformamide; and dimethyl sulfoxide; and a mixture thereof. Among them, γ-butyrolactone and ethylene carbonate are preferable in view of a high flash point, a high dielectric constant and advantageous properties for charge/discharge characteristics of a lithium ion cell.

The chain phosphate ester represented by the aforementioned general formula (IX) and/or the cyclic phosphate ester represented by the aforementioned general formula (X) may be contained in a mixture of the phosphate ester-based solvent and the above inflammable solvent in an amount ranging from 50 to 100% by volume, more preferably from 60 to 85% by volume. Less than 50% by volume of the phosphate ester is likely to cause difficulty in obtaining sufficient non-flammability.

A lithium ion cell of the present invention will be described in detail below. The lithium ion cell of the present invention comprises the above non-flammable nonaqueous electrolyte solution, a positive electrode containing a lithium transition metal oxide capable of absorbing and releasing lithium, and a negative electrode containing a carbon-based material capable of absorbing and releasing lithium. In the present invention, except for the compound additive, the lithium salt and the phosphate-based solvent, a component of the lithium ion cell, such as a positive electrode, a negative electrode and a separator, is not limited to a specific material, it may be made of any material used in conventional lithium ion cells without modification.

For example, a positive-electrode active material constituting the positive electrode includes a lithium transition metal oxide-based material, such as lithium manganese oxide ($LiMn^2O^4$), lithium cobalt oxide ($LiCoO_2$), lithium nickel oxide ($LiNiO_2$) or lithium titanium oxide ($Li_{4/3}Ti_{5/3}O_4$). The positive electrode is not limited to a specific shape. For example, the positive electrode may be a sheet-shaped electrode prepared by mixing a conductive material and adhesive with the lithium transition metal oxide-based material according to need, and applying the oxide-based material or the mixture onto a collector, or may be a pellet-shaped electrode prepared by subjecting the oxide-based material or the mixture to a press forming process. A positive-electrode collector may be made of aluminum or alloy thereof. Among them, aluminum is particularly preferable in view of light-weight and high electrochemical stability.

For example, a negative-electrode active material constituting the negative electrode includes graphite, surface-treated graphite, amorphous carbon and non-graphitizable carbon (hard carbon). Among them, surface-treated graphite is particularly preferable in view of capability to improve stability of phosphate ester, and high energy density. These negative-electrode active materials may be used in the form of a mixture of two or more thereof. The negative electrode is not limited to a specific shape, but may be a sheet-shaped electrode prepared by mixing a conductive material and adhesive with the active material according to need, and applying the active material or the mixture onto a collector, or a pellet-shaped electrode prepared by subjecting the active material or the mixture to a press forming process. A negative-electrode collector may be made of metal, such as copper, nickel or porous nickel, or alloy thereof. Among them, copper and porous nickel is particularly preferable in view of high formability to a thin film and high electrochemical stability.

A material of the separator includes a nonwoven, or a porous film made of polyolefin, such as polyethylene or polypropylene.

The lithium ion cell of the present invention is not limited to a specific shape, but may be formed in any suitable conventional shape, such as a flat shape (button-like shape), a cylindrical shape or a rectangular shape. FIG. 1 shows one example of a coin-shaped lithium ion cell using the non-flammable nonaqueous electrolyte solution of the present invention.

As shown in FIG. 1, in this lithium ion cell 1, a disc-shaped positive electrode 2 is disposed on the upper side of the cell 1, and a disc-shaped negative electrode 4 is disposed below the positive electrode 2 while interposing a disc-shaped separator 3 therebetween. Further, a spacer 5 is disposed below the negative electrode 4. The positive electrode 2, the separator 3, the negative electrode 4 and the spacer 5 are stacked in this order to form a cell body, and housed in a hermetically-sealed coin-shaped case 6. A spring 7 is interposed between the spacer 7 and a bottom surface of the case 6 to upwardly bias the cell body with a laminated structure comprised of the positive electrode 2, the separator 3, the negative electrode 4 and the spacer 5, so as to allow a top surface of the positive electrode 2 to be kept in contact with an upper inner surface of the case 6. A ring-shaped gasket 8 having a vertically-elongated rectangular shape in section (in FIG. 1) is disposed in the case 6. The case 6 is formed by joining a cup-shaped upper case 6a and a cup-shaped lower case 6b together along their peripheral edges while receiving the cell body composed of the positive electrode 2, the separator 3, the negative electrode 4 and the spacer 5, in an inner space of the case 6. The gasket 8 is provided as a means to hermetically seal the joined portion between the upper and lower cases 6a, 6b and electrically insulate between the positive and negative electrodes.

Typically, in the coin-shaped lithium ion cell as shown in FIG. 1, $LiCoO_2$ and graphite are used, respectively, in the positive electrode and the negative electrode. In this case, a charge reaction is expressed as follows:

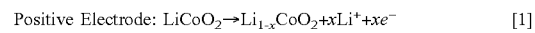
Positive Electrode: $LiCoO_2 \rightarrow Li_{1-x}CoO_2 + xLi^+ + xe^-$     [1]

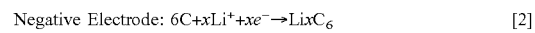
Negative Electrode: $6C + xLi^+ + xe^- \rightarrow Li_xC_6$     [2]

Respective discharge reactions in the positive and negative electrodes are induced in the opposite directions of the [1] and [2]. Typically, in a performance evaluation of one of the positive and negative electrodes, either one of the positive and negative electrodes is substituted with a lithium metal (Li) electrode as a counter electrode, and a positive half-cell of $Li/LiCoO_2$ or a negative half-cell of Li/graphite is used. The object of the present invention is to suppress reductive decomposition of the non-flammable solvent TMP (trimethyl phosphate) on a surface of the graphite negative electrode so as to provide a lithium ion cell having enhanced charge/discharge characteristics. In the present invention, a performance evaluation was conducted using a Li/graphite negative half-cell. Charge/discharge reactions in the graphite negative electrode are expressed as follows:

Discharge: $Li_xC_6 \rightarrow 6C + xLi^+ + xe^-$  [3]

Charge: $6C + xLi^+ + xe^- \rightarrow Li_xC_6$  [4]

In this cell, a porous film was used as the separator. The separator was impregnated with the electrolyte solution. As mentioned above, a case 6 for housing a cell body had an upper case 6a and a lower case. After setting cell components in the case, the case was hermetically sealed using a crimping machine. A gasket was also used for ensuring fluid-tightness of the cell.

In a negative half-cell, a positive electrode is substituted with a lithium metal electrode. In a positive half-electrode, a negative electrode is substituted with a lithium metal electrode.

While the following description will be made in connection with specific examples, the present invention is not limited to the specific example, but the scope of the invention should be determined by the appended claims and their legal equivalents. Respective performances of an electrolyte solution and a cell were evaluated by the following method.

1. Measurement of Electric Conductivity of Electrolyte Solution: An electric conductivity was measured at 20° C. using a conductivity meter (CM-20J "Electric Conductivity Meter" produced by DKK-TOA Co., Japan) and a cell (C-50101B "Cell for Electric Conductivity" produced by DKK-TOA Co.).

2. Evaluation of Non-Flammability of Electrolyte Solution: A glass-fiber filter sheet sufficiently impregnated with an electrolyte solution was hung up vertically, and a lower end of the filter sheet was heated for 10 seconds by a fire source. The non-flammability was evaluated based on whether a flame of the filter sheet disappears immediately after the fire source is removed.

3. Preparation of Lithium Ion Cell: A positive electrode was prepared as follows. Acetylene black serving as a conductive material was homogenously mixed with lithium cobalt oxide ($LiCoO_2$) serving as a positive-electrode active material. The obtained mixture was dispersed in N-methyl-2-pyrrolidinone as a solvent for fluorine resin serving as adhesive, and stirred. A weight ratio of lithium cobalt oxide:acetylene black: fluorine resin was 90:5:5. After the mixture was formed as homogenous slurry, the slurry was applied onto one surface of an aluminum foil serving as a collector to obtain a positive electrode sheet. This positive electrode sheet was placed on a heat plate heated at 80° C., and dried for 10 minutes. Then, the dried positive electrode sheet was stored in a dry atmosphere.

A negative electrode was prepared as follows. Surface-treated graphite serving as a negative-electrode active material was dispersed in N-methyl-2-pyrrolidinone as a solvent for fluorine resin serving as adhesive, and stirred. A weight ratio of carbon material:fluorine resin was 95:5. After the mixture was formed as homogenous slurry, the slurry was applied onto one surface of a copper foil serving as a collector to obtain a negative electrode sheet. This negative electrode sheet was placed on a heat plate heated at 80° C., and dried for 10 minutes. Then, the dried negative electrode sheet was stored in a dry atmosphere.

Each of the obtained positive and negative sheets was formed into a disc-shaped electrode having a diameter of 12 mm, using a punching machine. A polyethylene multilayer film was formed into a disc-shaped separator having a diameter of 18 mm, using a punching machine. Further, a lithium metal foil was formed into a disc-shaped electrode having a diameter of 14 mm, using a punching machine under a dry argon atmosphere. Finally, under a dry argon atmosphere, the obtained disc-shaped electrodes and the separator were hermetically housed in a con-shaped case to obtain a positive-negative coin-shaped lithium ion cell. The coin-shaped case had a diameter of 20 mm and a height of 3.2 mm. Further, a positive lithium half-cell or a negative lithium half-cell was prepared.

4. Evaluation of Cell Charge/Discharge Characteristics: A cell charging operation was performed under a constant current-constant voltage mode, and a cell discharging operation was performed under a constant current mode. A constant-voltage charge period was set at 3 hours. A current rate in each of the cell charging and discharging operations was 0.2 C. A cutoff voltage for the lithium ion cell was set at 4.2V and 2.5V, and a cutoff voltage for the negative half-cell was set at 10 mV and 1.5V. An ambient temperature of the cells was 20° C.

With reference to the following Table 1, each of Comparative Examples and Inventive Examples will be described. As described above, the problem in a phosphate ester-based electrolyte solution for a lithium ion cell arises from difficulty in cell charge/discharge due to a reductive decomposition reaction of a phosphate ester on a surface of a carbon-based negative electrode. As shown in Table 1, a plurality of negative half-cells using respective electrolyte solutions were prepared, and respective charge/discharge characteristics based on the electrolyte solutions were compared with each other.

Each brevity code in the Table 1 represents the following compound:

LiBETI: $LiN(SO_2C_2F_5)_2$ TMP: trimethyl phosphate
VC: vinylene carbonate VA: vinyl acetate
NMP: N-methyl-2-pentanone CH: cyclohexane
CP: cyclopentanone VEC: vinyl ethylene carbonate
AMC: alkyl methyl carbonate GBL: γ-butyrolactone
LiPF6: fluorinated lithium phosphate

TABLE 1

| | | Electrolyte Solution | | | Cell Characteristics *5 | | | | |
| | | | | | Initial discharge capacity (mAh) | Initial charge/ discharge efficiency (%) | DCM Ratio (%) *4 | Non-Flammability | Conductivity (mS/cm) |
| | No | Solute *1 | Solvent (*2) | Additive *3 | | | | | |
|---|---|---|---|---|---|---|---|---|---|
| Inventive Example | 1 | 2 mol/dm³ LiBETI | TMP | 2% VC + 8% VA | 1.58 | 80.9 | 88.5 | YES | 5.6 |
| | 2 | 2 mol/dm³ LiBETI | TMP | 2% VC + 8% VA + 2% NMP | 1.68 0.98 *6 | 86.3 84.1 *6 | 98.5 99.3 *6 | YES | 5.4 |
| | 3 | 2 mol/dm³ LiBETI | TMP | 2% VC + 8% VA + 2% CH | 1.72 | 86.5 | 99.4 | YES | 5.3 |

TABLE 1-continued

|  | No | Solute *1 | Solvent (*2) | Additive *3 | Initial discharge capacity (mAh) | Initial charge/ discharge efficiency (%) | DCM Ratio (%) *4 | Non-Flammability | Conductivity (mS/cm) |
|---|---|---|---|---|---|---|---|---|---|
|  | 4 | 2 mol/dm³ LiBETI | TMP | 2% VC + 8% VA + 2% CP | 168 | 86.1 | 99.1 | YES | 5.5 |
|  | 5 | 2 mol/dm³ LiBETI | TMP | 2% VC + 8% VEC + 2% NMP | 1.70 | 84.1 | 99.0 | YES | 5.7 |
|  | 6 | 2 mol/dm³ LiBETI | TMP | 2% VC + 8% VEC + 2% CH | 1.73 | 85.4 | 99.5 | YES | 5.4 |
|  | 7 | 2 mol/dm³ LiBETI | TMP | 2% VC + 8% VEC + 2% CP | 1.64 | 87.2 | 99.0 | YES | 5.6 |
|  | 8 | 2 mol/dm³ LiBETI | TMP | 2% VC + 8% AMC + 2% NMP | 1.69 | 85.2 | 99.3 | YES | 5.3 |
|  | 9 | 2 mol/dm³ LiBETI | TMP | 2% VC + 8% AMC + 2% CH | 1.72 | 86.4 | 99.3 | YES | 5.4 |
|  | 10 | 2 mol/dm³ LiBETI | TMP | 2% VC + 8% AMC + 2% CP | 1.67 | 86.2 | 98.8 | YES | 5.5 |
|  | 11 | 2 mol/dm³ LiBETI | TMP + GBL (7:3) | 2% VC + 8% VA + 2% NMP | 1.77 1.12 *6 | 88.9 86.7 *6 | 100 100 *6 | YES | 6.3 |
| Comparative Example | 1 | 1 mol/dm³ LiBETI | EC + DEC (1:2) | — | 1.73 1.10 *6 | 83 81 *6 | 99.3 99.6 *6 | NON | 8.5 |
|  | 2 | 1 mol/dm³ LiBETI | TMP | — | 0.24 | 12.0 | 32 | YES | 6.0 |
|  | 3 | 1 mol/dm³ LiBETI | TMP | 2% VC + 8% VA | 1.36 | 58.2 | 92.4 | YES | 5.9 |

Figure 2:
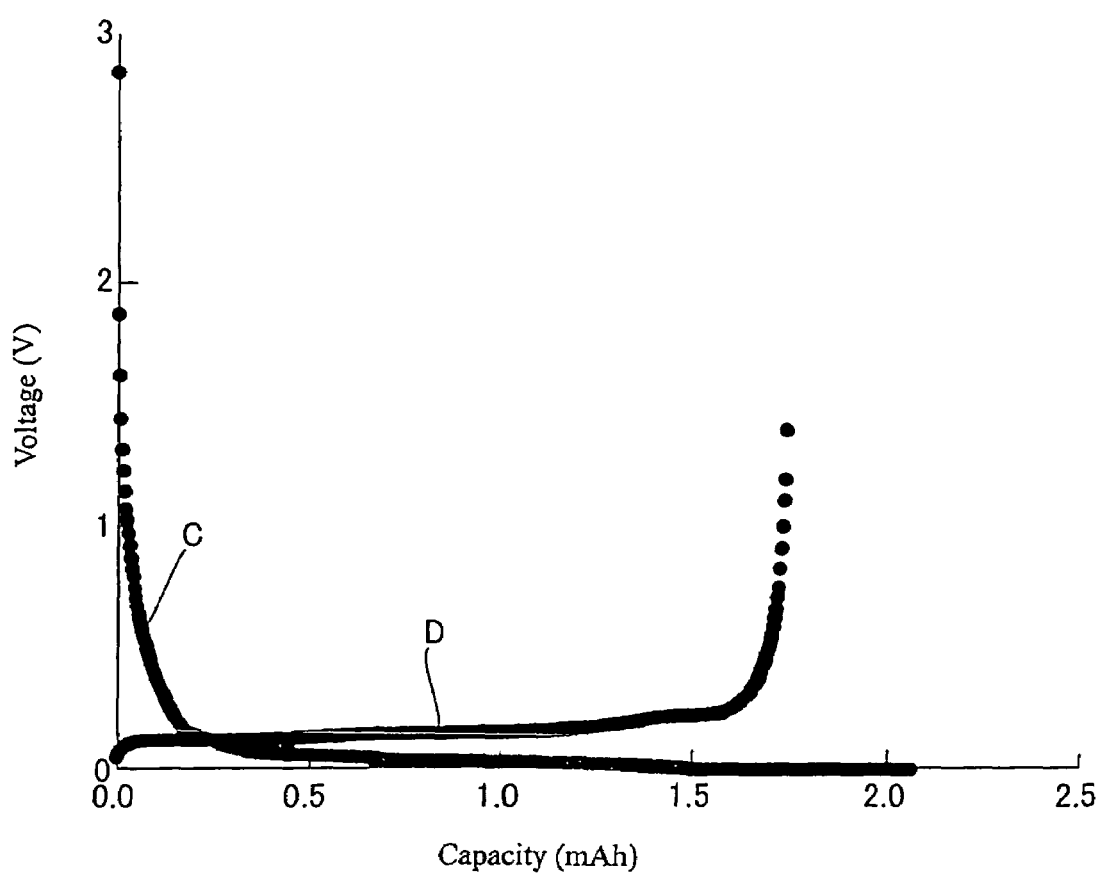
FIG. 2 is a graph showing a charge/discharge curve of a negative half-cell using a 1 mol/dm$^3$ LiPF$_6$/EC+DEC (1:2) electrolyte solution in Comparative Example 1.

*1: Mol concentration to volume of solute and solvent
(*2): Volume ratio between two solvents
*3: Weight ratio to total weight of solute and solvent
*4: DCM Ratio (Discharge Capacity Maintenance Ratio): percentage of discharge capacity in 10th cycle to discharge capacity in 1st cycle
*5: Charge/discharge characteristics of negative half-cell
*6: Charge/discharge characteristics of lithium ion cell FIG. 2 shows charge/discharge characteristics based on the electrolyte solution in Comparative Example 1. This electrolyte solution is a conventional electrolyte solution of 1 mol/dm³LiPF⁶/EC+DEC (1:2) which is used in a commercially-available lithium ion cell. As shown in FIG. 2, the negative half-cell using this electrolyte solution exhibits excellent charge/discharge characteristics. That is, as seen in the charge curve C, a capacity in a voltage range of 0.4 V or more which reflects a side reaction at an electrode has a low value, and it is proven that the side reaction is effectively suppressed by using the electrolyte solution in Comparative Example 1. This makes it possible to obtain high discharge capacity and charge/discharge efficiency, as shown in the discharge curve D. However, the electrolyte solution in Comparative Example 1 has inflammability and low flash point which lead to safety problems.

Figure 3:
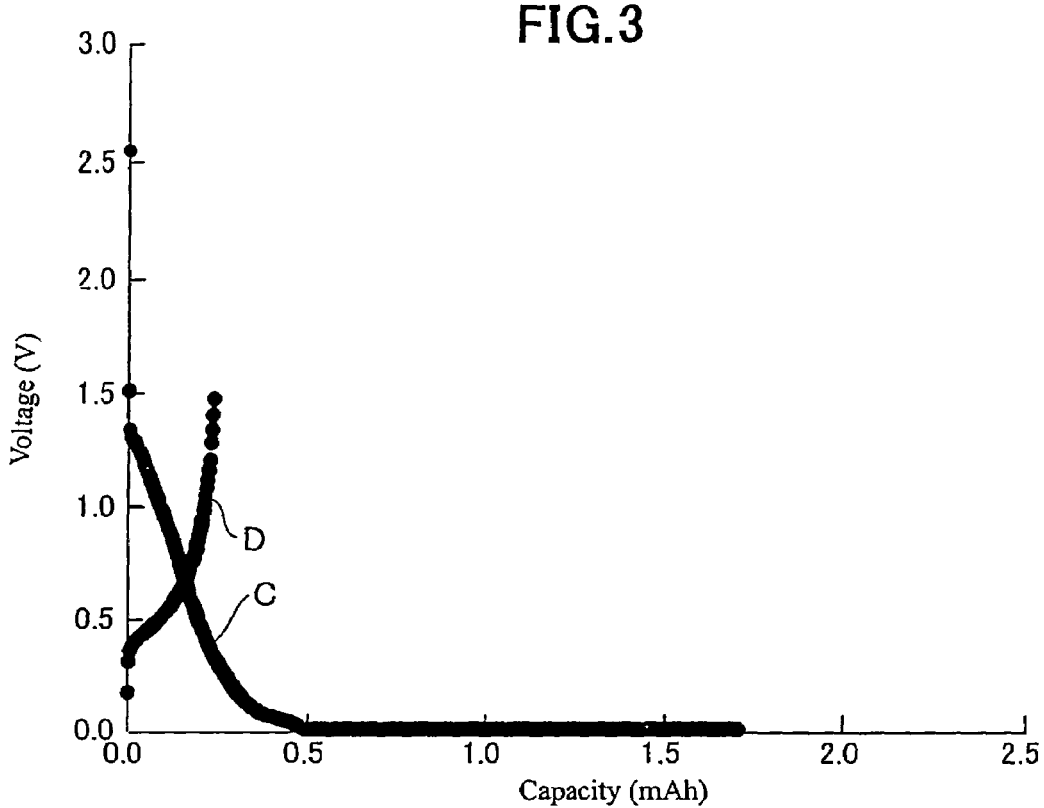
FIG. 3 is a graph showing a charge/discharge curve of a negative half-cell using an electrolyte solution prepared by dissolving 1 mol/dm$^3$ LiBETI in a TMP solvent, in Comparative Example 2.

In Comparative Example 2, an electrolyte solution used therein was prepared by dissolving 1 mol/dm³ LiBETI in a TMP solvent. While this electrolyte solution is non-flammable and excellent in safety, a reductive decomposition reaction of the TMP solvent occurs on a surface of the graphite negative electrode, as shown in FIG. 3 to cause difficulty in sufficiently performing a cell charging operation. Consequently, Comparative Example 2 exhibits a low discharge capacity and a low charge/discharge efficiency. While the characteristic curve C in FIG. 3 indicates a charging operation, only the reductive decomposition reaction of the TMP solvent on the surface of the graphite negative electrode is developed without the cell charging operation. Thus, the cell cannot be charged. As the result of no cell charge, no discharge characteristic can be obtained.

Figure 4:
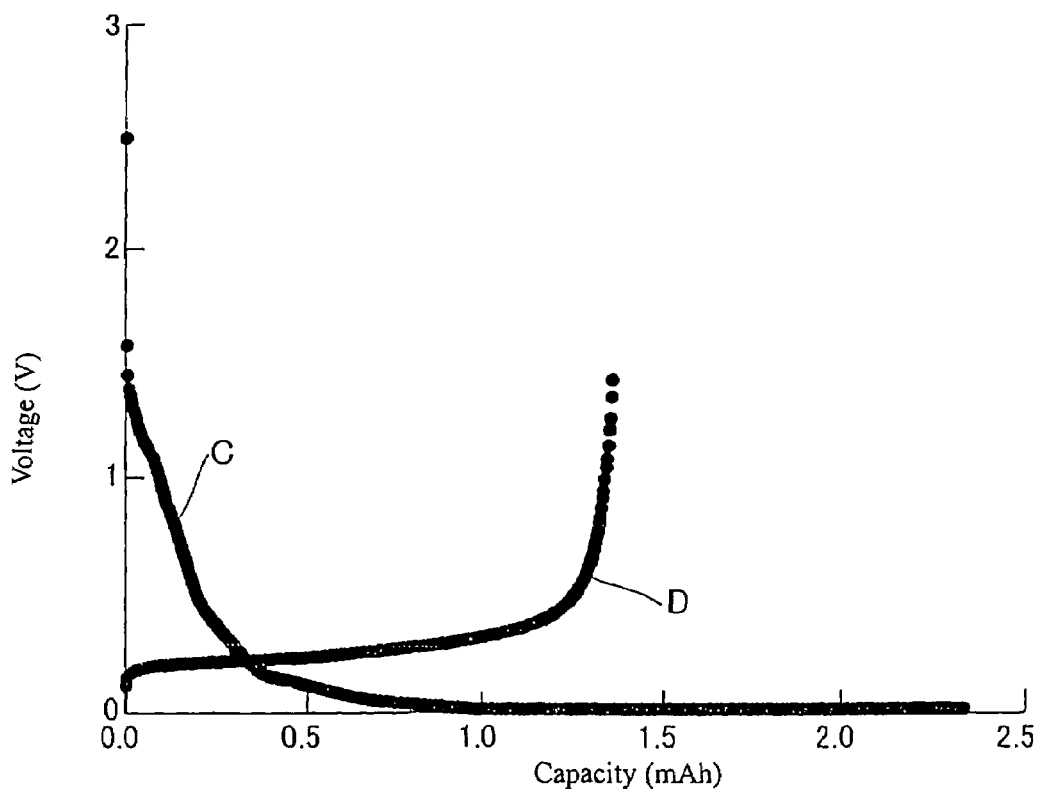
FIG. 4 is a graph showing a charge/discharge curve of a negative half-cell using a 1 mol/dm$^3$ LiBETI/TMP electrolyte solution added with a compound additive of 2% VC and 8% VA, in Comparative Example 3.

In Comparative Example 3, an electrolyte solution used therein was prepared by adding a binary composite additive of VC and VA to a 1 mol/dm³LiBETI/TMP electrolyte solution. The electrolyte solution in Comparative Example 3 has non-flammability. As shown in FIG. 4, this electrolyte solution can improve charge/discharge characteristics of the negative half-cell as compared with Comparative Example 2. However, a reductive decomposition reaction of the TMP solvent is not sufficiently suppressed during a charging operation, and a discharge capacity is inferior to that of Comparative Example 1.

Figure 5:
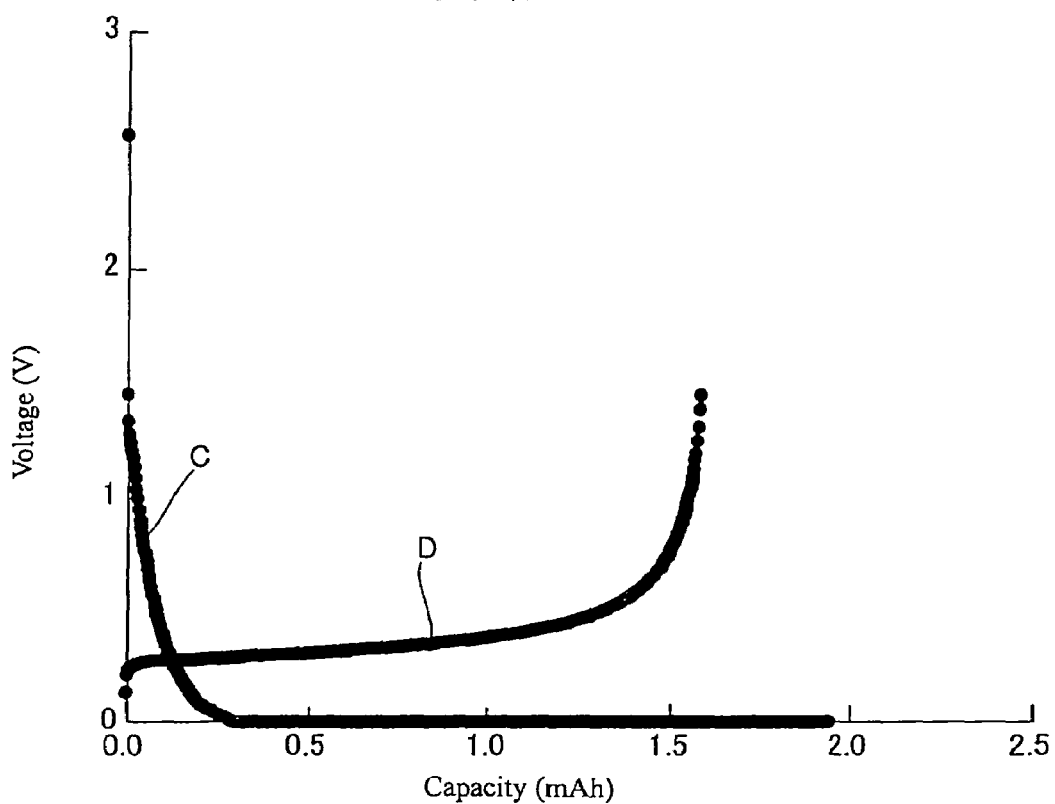
FIG. 5 is a graph showing a charge/discharge curve of a negative half-cell using a 2 mol/dm$^3$ LiBETI/TMP electrolyte solution added with a compound additive of 2% VC and 8% VA, in Inventive Example 1.

In Inventive Example 1, an electrolyte solution used therein was prepared by changing a concentration of LiBETI from 1 mol/dm³ in Comparative Example 3 to 2 mol/dm³. As seen in FIG. 5, an increase in lithium concentration makes it possible to drastically improve charge/discharge characteristics of the negative half-cell while maintaining non-flammability of the electrolyte solution. Specifically, any significant side reaction is not observed in an initial stage of a charging operation, and therefore a large discharge capacity can be obtained. It is believed that loved that a BETI⁻ anion itself is decomposed on the surface of the negative electrode in a high concentration to advantageously form a protective film thereon.

Figure 6:
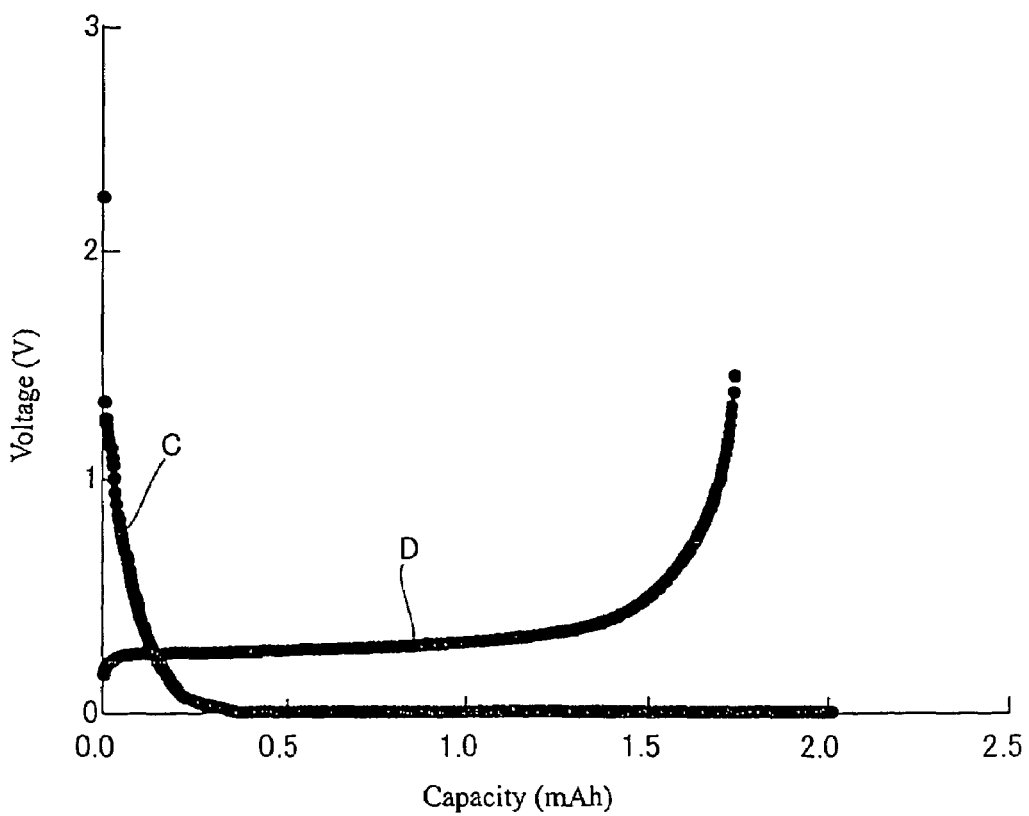
FIG. 6 is a graph showing a charge/discharge curve of a negative half-cell using a 2 mol/dm$^3$ LiBETI/TMP electrolyte solution added with a ternary compound additive of 2% VC, 8% VA and 2% NMP, in Inventive Example 2.

In Inventive Examples 2 to 4, respective electrolyte solutions were prepared by further adding a third additive of 2% NMP, 2% CH or 2% CP to the electrolyte solution in Inventive Example 1. The electrolyte solution in Inventive Examples 2 to 4 allows the negative half-cell to have enhanced charge/discharge characteristics while maintaining non-flammability. FIG. 6 shows charge/discharge characteristic curves based on the electrolyte solution in Inventive Example 2. Each of NMP, CH and CP is used as a solvent for fluorine resin serving as adhesive for an electrode active material. The solvent added to the electrolyte solution makes it possible to reduce change in volume of the electrode during charging/discharging operations so as to provide advantageous effects to cell charge/discharge characteristics.

In Inventive Examples 5 to 10, respective electrolyte solutions were prepared by substituting the additive VA in Inventive Examples 2 to 4 to VEC or AMC. According to the rest results on Inventive Examples 5 to 10, it was verified that, even if VEC or AMC is used in place of VA, the negative half-cell can exhibit excellent cell charge/discharge characteristics while maintaining non-flammability.

Figure 7:
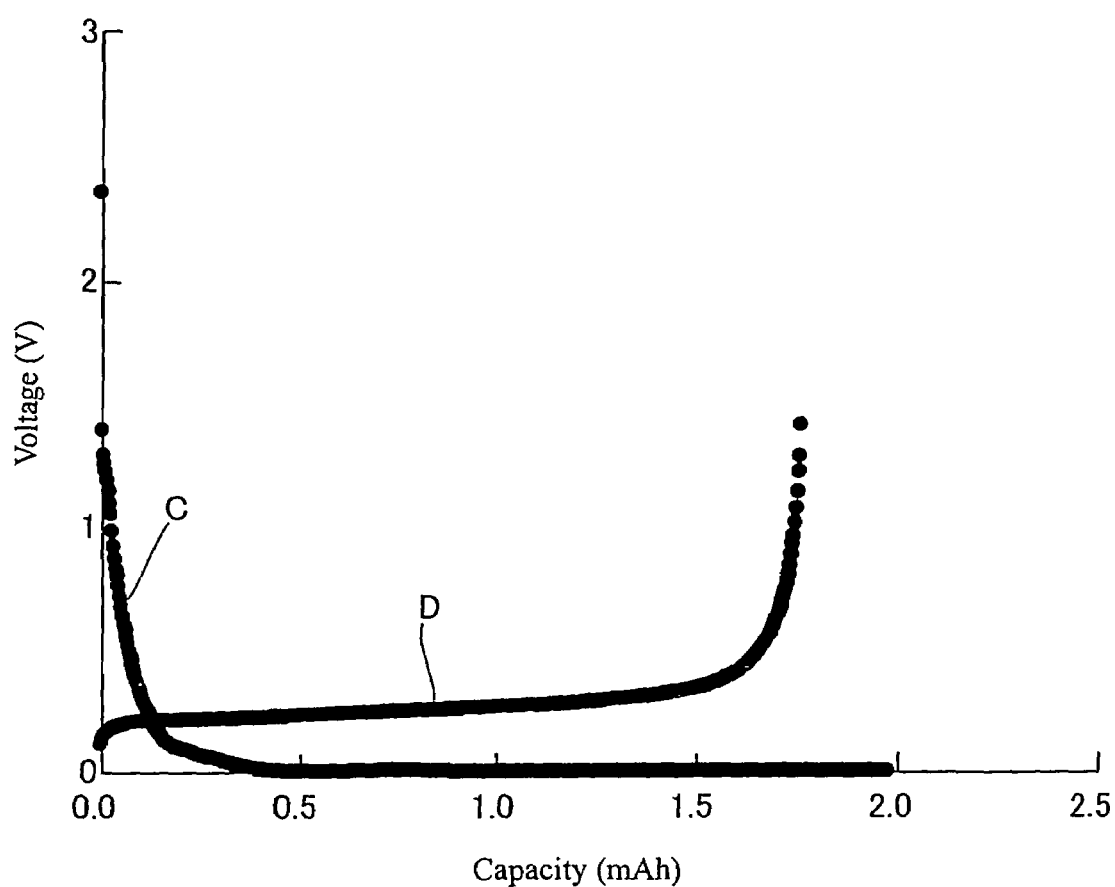
FIG. 7 is a graph showing a charge/discharge curve of a negative half-cell using a 2 mol/dm$^3$ LiBETI/TMP+GBL (7:3) electrolyte solution added with a ternary compound additive of 2% VC, 8% VA and 2% NMP, in Inventive Example 11.

In Inventive Example 11, an electrolyte solution was prepared by mixing 30% GBL to a TMP solvent. As seen in FIG. 7, this electrolyte solution makes it possible to maintain non-flammability and allow the negative half-cell to have more enhanced charge/discharge characteristics than those of the cell using a solvent consisting of only the TMP solvent. Further, a lithium ion cell using this electrolyte solution exhibits charge/discharge characteristics equivalent to those of a lithium ion cell using the electrolyte solution in Comparative Example 1.

INDUSTRIAL APPLICABILITY

As mentioned above, the nonaqueous phosphate ester-based electrolyte solution for lithium ion cells of the present invention has non-flammability and allows a lithium ion cell to exhibit excellent charge/discharge characteristics. The present invention has excellent specific effects on safety and reliability of lithium ion cells.

What is claimed is:

1. A non-flammable, nonaqueous electrolyte solution having a lithium salt dissolved in a solvent containing a phosphate ester, comprising at least one additive compound selected from each of the three compound groups consisting of:

(a) vinylene carbonate compounds represented by formula (I):

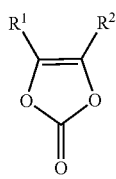

(I)

wherein $R^1$ and $R^2$ each independently represents a hydrogen atom or a straight-chain or branched-chain alkyl group having 1 to 4 carbon atoms, (b) a compound selected from the groups consisting of vinyl acetate compounds represented by formula (II), alkyl methyl carbonate compounds represented by formula (III), and vinyl ethylene carbonate compounds of formula (IV):

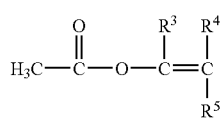

(II)

wherein $R^3$, $R^4$ and $R^5$ each independently represents a hydrogen atom or a straight-chain or branched-chain alkyl group having 1 to 4 carbon atoms,

(III)

wherein $R^6$ represents a hydrogen atom or a straight-chain or branched-chain alkyl group having 1 to 4 carbon atoms,

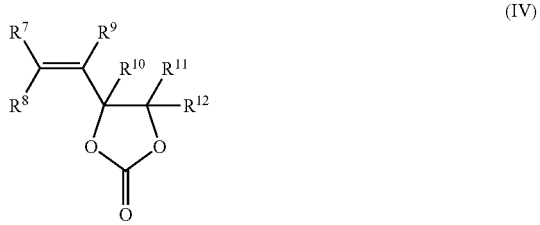

(IV)

wherein $R^7$, $R^8$, $R^9$, $R^{10}$, $R^{11}$ and $R^{12}$ each independently represents a hydrogen atom or a straight-chain or branched-chain alkyl group having 1 to 4 carbon atoms; and (c) a compound selected from the group consisting of 2-pyrrolidinone compounds represented by formula (V), cyclic alkyl compounds represented by formula (VI), and cyclic pentanone compounds represented by formula (VII):

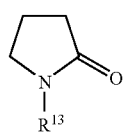

(V)

wherein $R^{13}$ represents a hydrogen atom or a straight-chain or branched-chain alkyl group having 1 to 4 carbon atoms,

(VI)

wherein $R^{14}$ represents a straight-chain or branched-chain alkylene group having 2 to 4 carbon atoms,

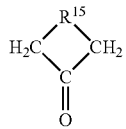

(VII)

wherein $R^{15}$ represents a straight-chain or branched-chain alkylene group having 1 to 3 carbon atoms;

wherein each of compounds (a), (b), and (c) is present in an amount from 1 to 12% by weight and the total amount of compounds (a), (b), and (c) is from 5 to 20% by weight;

and further wherein the total concentration of the lithium salt in the phosphate ester-based solvent is in the range of 1.5 to 2.5 mol/dm$^3$;

and further wherein the solvent comprises a phosphate ester selected from the group consisting of the chain phosphate esters of formula (IX) and the cyclic phosphate esters of formula (X), wherein at least either one of the chain phosphate ester represented by formula (IX) and the cyclic phosphate ester represented by formula (X) is contained in the phosphate ester-based solvent in an amount ranging from 50 to 100% by volume:

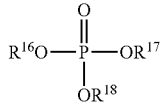
(IX)

wherein $R^{16}$, $R^{17}$ and $R^{18}$ each independently represents an alkyl group having 1 or 2 carbon atoms, in which each of the hydrogen atoms may be substituted with fluorine,

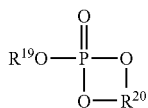
(X)

wherein $R^{19}$ represents an alkyl group having 1 or 2 carbon atoms in which each of hydrogen may be substituted with fluorine, and $R^{20}$ represents an alkylene group having 2 to 4 carbon atoms.

2. The non-flammable nonaqueous electrolyte solution of claim 1, wherein the lithium salt is at least one compound selected from the group consisting of lithium salts of an inorganic acid formed from a lithium ion and an anion selected from $PF_6$ and $BF_4$, and lithium salts of an organic acid formed from a lithium ion and an anion of formula (VIII):

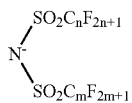
(VIII)

wherein m and n each independently represent an integer selected from 1, 2, 3, or 4.

3. The non-flammable nonaqueous electrolyte solution of claim 1, wherein the phosphate ester-based electrolyte solution comprises a chain phosphate ester having formula (IX), and at least one cyclic phosphate ester having formula (X):

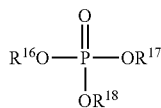
(IX)

wherein $R^{16}$, $R^{17}$ and $R^{18}$ each independently represents an alkyl group having 1 or 2 carbon atoms, in which each of the hydrogen atoms may be substituted with fluorine, (X)

wherein $R^{19}$ represents an alkyl group having 1 or 2 carbon atoms in which each of hydrogen may be substituted with fluorine, and $R^{20}$ represents an alkylene group having 2 to 4 carbon atoms.

4. The non-flammable nonaqueous electrolyte solution of claim 1, wherein the phosphate ester-based electrolyte solution further comprises at least one compound selected from the group consisting of carbonate-based compounds, lactone-based compounds, ether-based compounds, sulfolane-based compounds and dioxolan-based compounds.

5. A lithium ion cell comprising:
an electrolyte solution consisting of the non-flammable nonaqueous electrolyte solution of claim 1;
a positive electrode containing a lithium transition metal oxide capable of absorbing and releasing lithium; and
a negative electrode containing a carbon-based material capable of absorbing and releasing lithium.

* * * * *